United States Patent Office.

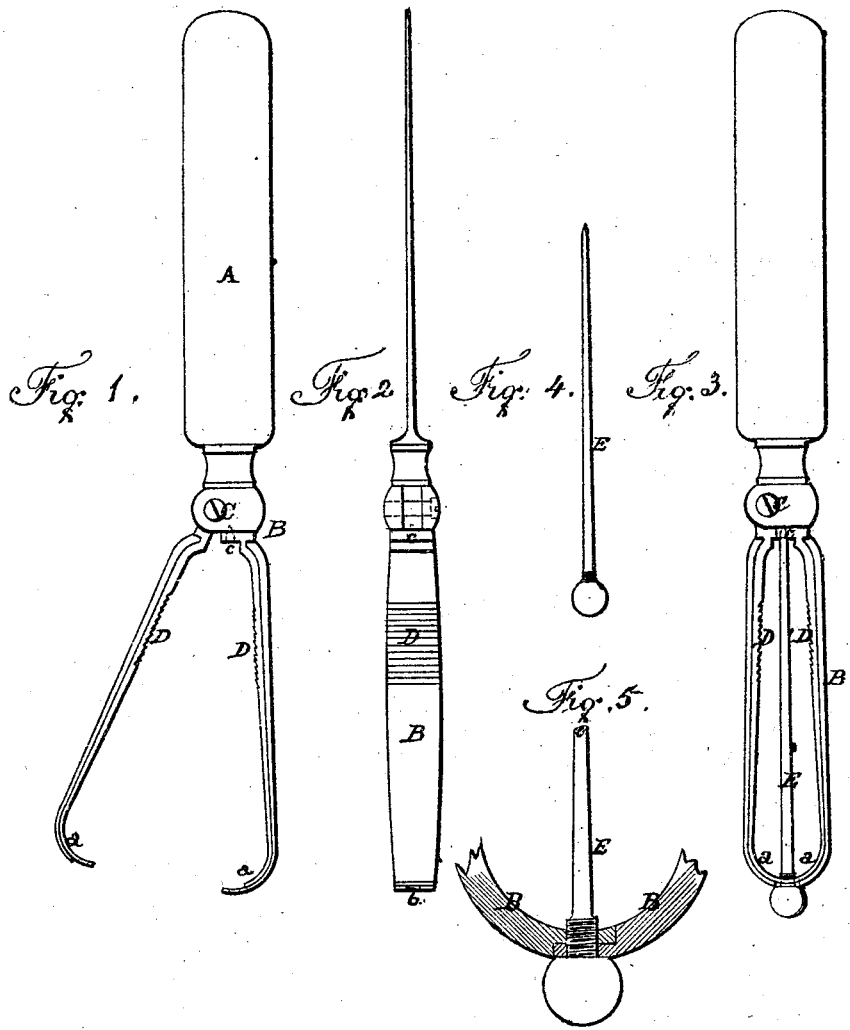

GEORGE A. FAIRFIELD, OF HARTFORD, CONNECTICUT.

Letters Patent No. 101,448, dated April 5, 1870.

IMPROVED KNIFE, NUT-CRACKER, AND PICKER.

The Schedule referred to in these Letters Patent and making part of the same.

To all whom it may concern:

Be it known that I, GEORGE A. FAIRFIELD, of Hartford, in the State of Connecticut, have invented a Table or Fruit-Knife, Combined with a Nut-Cracker, and also with a Nut-Picker; and I do hereby declare that the following, taken in connection with the drawings which accompany and form part of this specification, is a description of my invention sufficient to enable those skilled in the art to practice it.

Figure 1 represents my improved knife, with the jaws of the handle which compose the nut-cracker shown open;

Figure 2 is an edge or side view, with the hinged arm removed;

Figure 3 is a plan, with the jaws closed and held in place by a nut-picker;

Figure 4 is the picker detached; and

Figure 5, an enlarged view, showing the manner in which the jaws are held together by the screw-threaded pin or picker when the implement is closed and ready for use as a knife only.

A represents the knife-blade, and

B the handle.

This handle I make in two parts, as shown, the one integral or rigidly affixed to the stock of the blade, and the other hinged thereto, as seen at C.

These two parts I form so as to leave a sufficient space between them when partially open or separated, to receive and permit the crushing or cracking of the nut at a point in the neighborhood of the hinge, as seen at D, the arms on their inner faces being serrated, ridged, or roughened for a short distance at such point to prevent the nut from slipping or flying out, the leverage of the two longer arms, when compressed together upon a nut by the grasp of the hand, serving, as in ordinary nut-crackers, to multiply the power.

The outer ends of the two parts of the handle I bend or curve inward toward each other, as seen at a, one end lapping over the other so as to make a neat, smooth fit, and a screw-threaded hole, b, is made through both of these ends, or one only of the holes need be threaded to receive a pin or nut, which may serve to hold together these parts of the handle when not in use for a nut-cracker.

So far as described, the implement is complete as a combined knife and nut-cracker; but as a nut-picker is usually needed in connection with a cracker, I have devised an efficient as well as simple mode of adapting the above-described implement for picking also, so as to unite three functions and uses in one and the same implement, or rather three different implements in one, without rendering it clumsy or inconvenient, but on the contrary, of no more than ordinary size, and light and tasteful in appearance.

To effect this, I employ a picker, E, shaped like a stiletto, its head serving as the screw or pin for confining together the two arms of the handle, and the point reposing in a cavity prepared for it at c, in the stock, near the joint or hinge.

This arrangement and securing of the picker (the screw-thread insuring its holding its place until diliberately removed for use) not only holds the crackers together, but it sheathes the point of the picker and adds much, as will be seen, to the beauty and finish.

It will be evident that a great variety of patterns may be made, and divers modifications, without departing from the spirit of my invention; also, that both arms of the cracker might be hinged, if preferred; also, that the picker may be made of different shapes or styles, or may be secured to the handle by any well-known means of attachment, instead of by a screw-thread; also, that the knife-blade may be detachable from the cracker, if desired; but the general construction I have shown I deem the best, because of its entire simplicity, neatness, and efficiency.

I claim the combination of a fruit or table-knife with a nut-cracker, substantially as set forth.

Also, the combination of a nut-cracker with a nut-picker, substantially as set forth.

Also, the combination with a fruit or table-knife of a nut-cracker and a nut-picker, substantially as set forth.

GEORGE A. FAIRFIELD.

Witnesses:
ERASTUS SMITH,
WILLIE D. CONWALL.